(12) United States Patent
Cowan, Jr.

(10) Patent No.: US 6,386,117 B1
(45) Date of Patent: May 14, 2002

(54) ROADWAY/VEHICLE INTERFACE APPARATUS

(76) Inventor: Maynard Cowan, Jr., 1107 Stagecoach SE., Albuquerque, NM (US) 87123

( * ) Notice: Subject to any disclaimer, the term of this patent is extended or adjusted under 35 U.S.C. 154(b) by 198 days.

(21) Appl. No.: 09/655,092

(22) Filed: Sep. 5, 2000

(51) Int. Cl.$^7$ .............................................. B61C 11/00
(52) U.S. Cl. ....................................................... 105/30
(58) Field of Search ........................... 105/30, 150, 151

(56) References Cited

U.S. PATENT DOCUMENTS

| | | |
|---|---|---|
| 183,566 A | 10/1876 | Holdsworth |
| 720,291 A | 2/1903 | Smith |
| 2,229,015 A | 1/1941 | King |
| 2,316,223 A | 4/1943 | Cheneau |
| 3,194,178 A | 7/1965 | Weston |
| 5,014,864 A * | 5/1991 | Richter et al. ............... 213/104 |
| 5,086,705 A * | 2/1992 | Jarvis ........................... 105/30 |
| 5,127,338 A * | 7/1992 | Flux ............................. 105/151 |
| 5,213,045 A * | 5/1993 | Gersemsky ................... 104/93 |
| 5,507,679 A * | 4/1996 | Getsay ......................... 105/30 |
| 5,662,045 A * | 9/1997 | Miller et al. .................. 105/30 |

* cited by examiner

Primary Examiner—S. Joseph Morano
Assistant Examiner—Robert J. McCarry, Jr.
(74) Attorney, Agent, or Firm—Robert W. Harris

(57) ABSTRACT

Apparatus for the interface of an elevated vertical roadway and vehicle wheel, for achieving greater traction than possible using vehicle weight, and for minimizing vehicle wheel oscillation against the roadway, for minimizing roadway damage associated with heavy vehicle motion, said apparatus having a roadway/wheel interface geometry comprising a substantially vertical roadway with substantially vertical but concave sides, and convex wheel rims rolling on said convex roadway sides, with wheel rim width which is equal to or less than the width of the concave part of the roadway side; and said apparatus having a compression apparatus, independent of vehicle weight, for causing the wheels to be in substantial compression against the side of the roadway, in one said embodiment said compression apparatus being formed by the combination of pairs of parallel wheel axles on opposite sides of the roadway, and cables wound in substantial tension around each said pair of axles, said tensioned cables urging said axles toward one another and thus compressing the wheels strongly against the sides of the roadway.

12 Claims, 11 Drawing Sheets

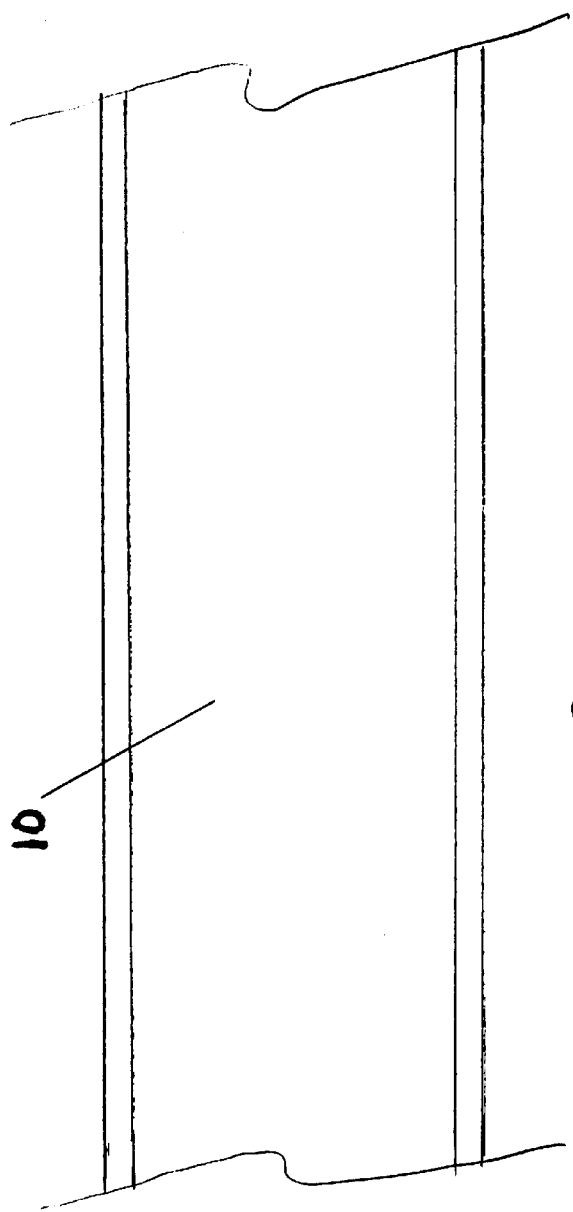
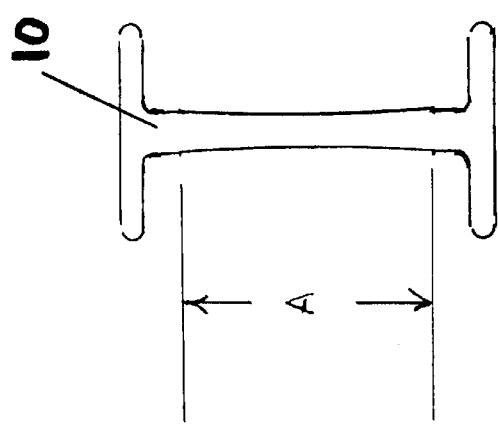
SIDE VIEW
FIG 1(b)
END VIEW
FIG 1(a)

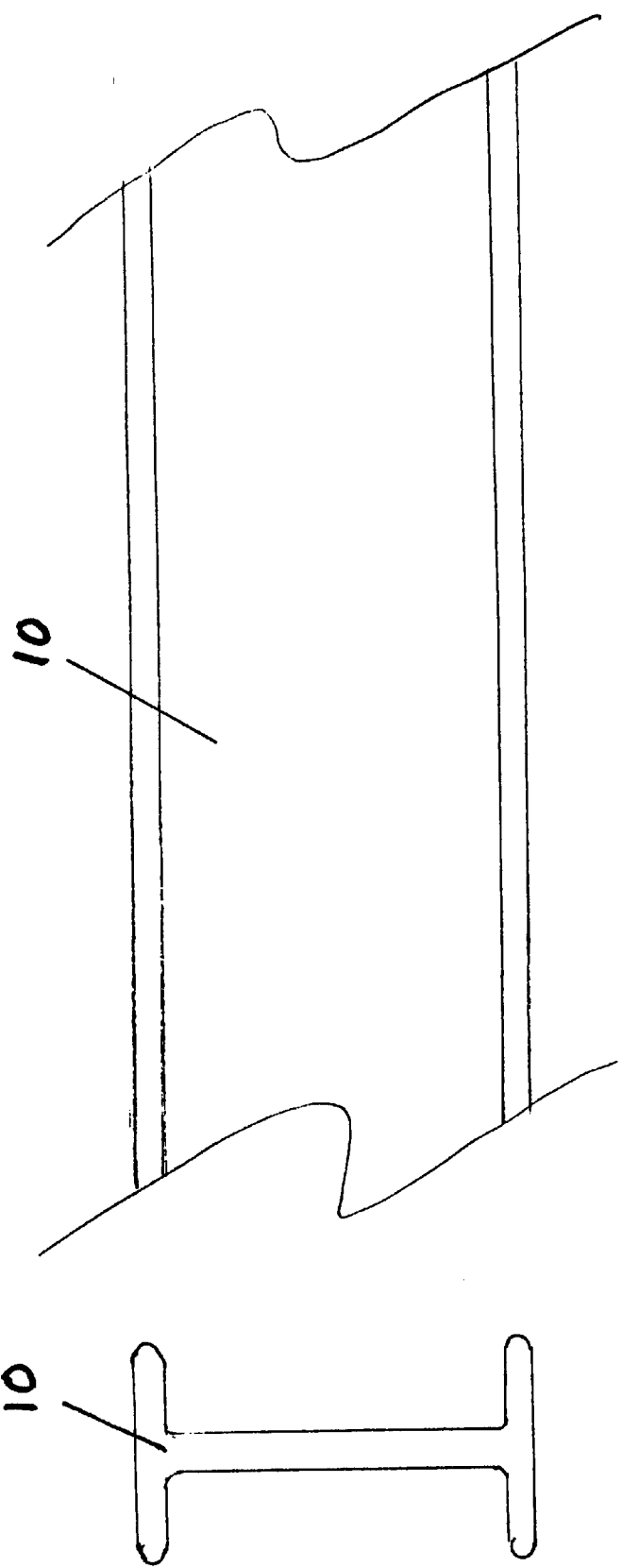

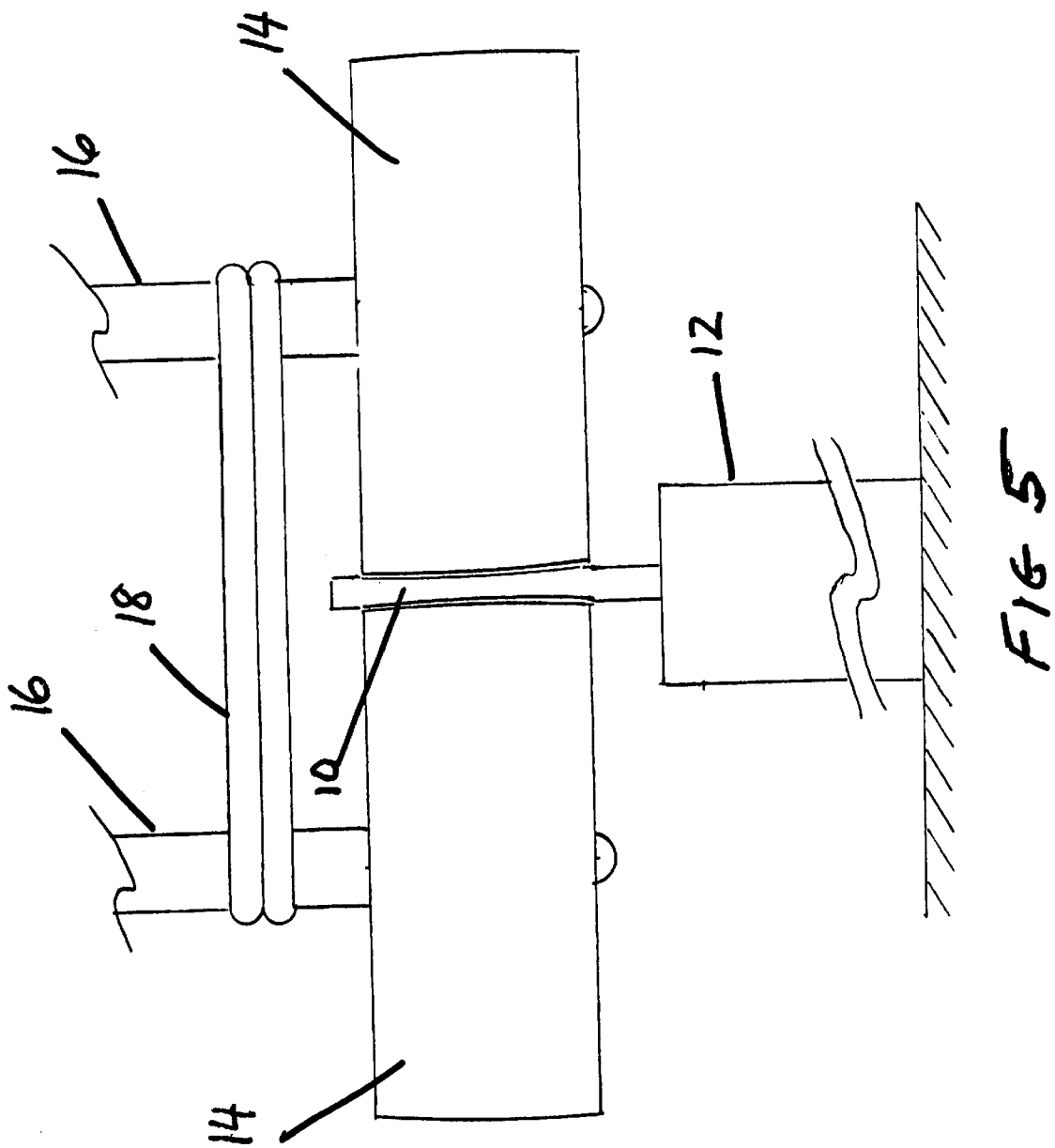

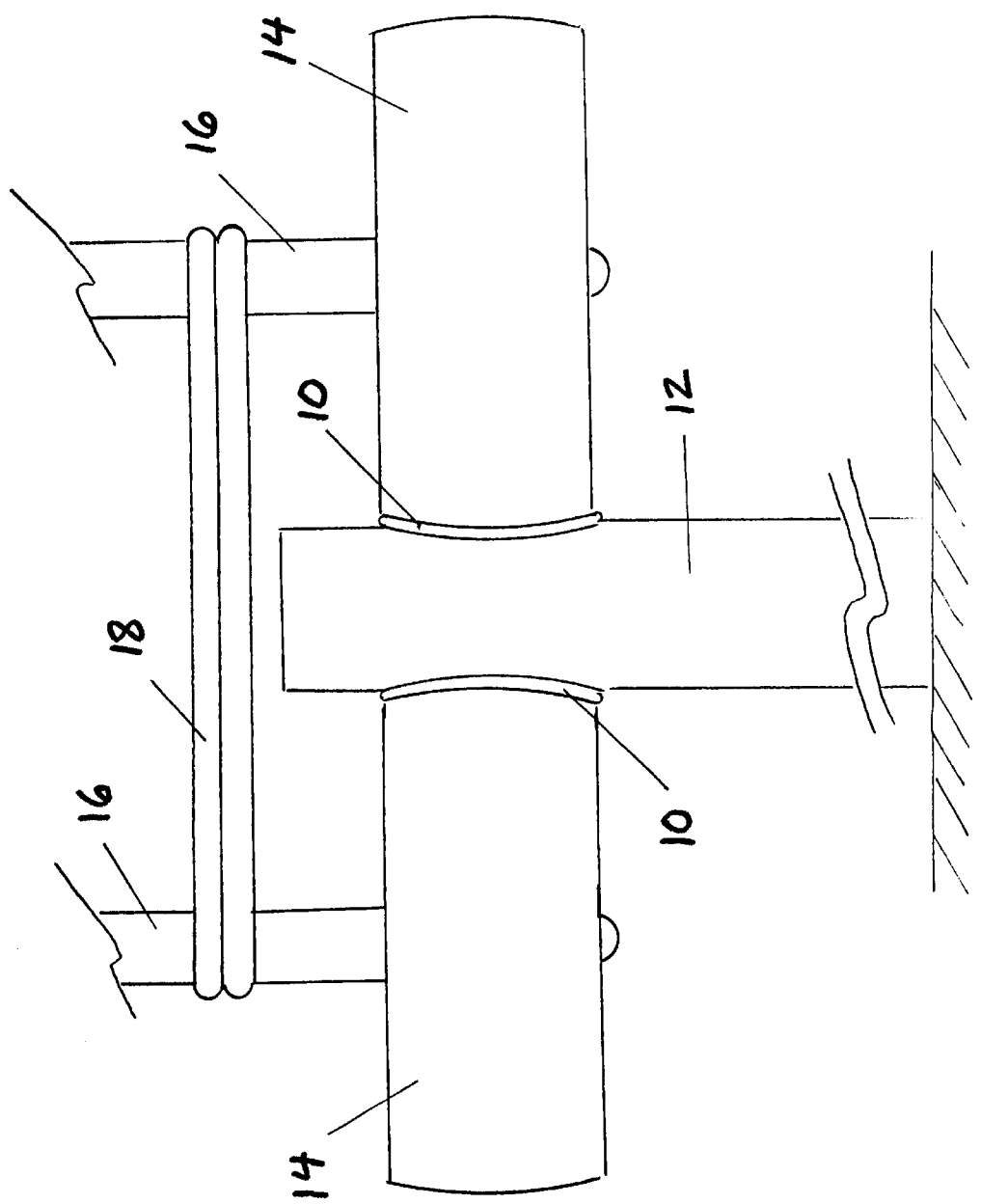

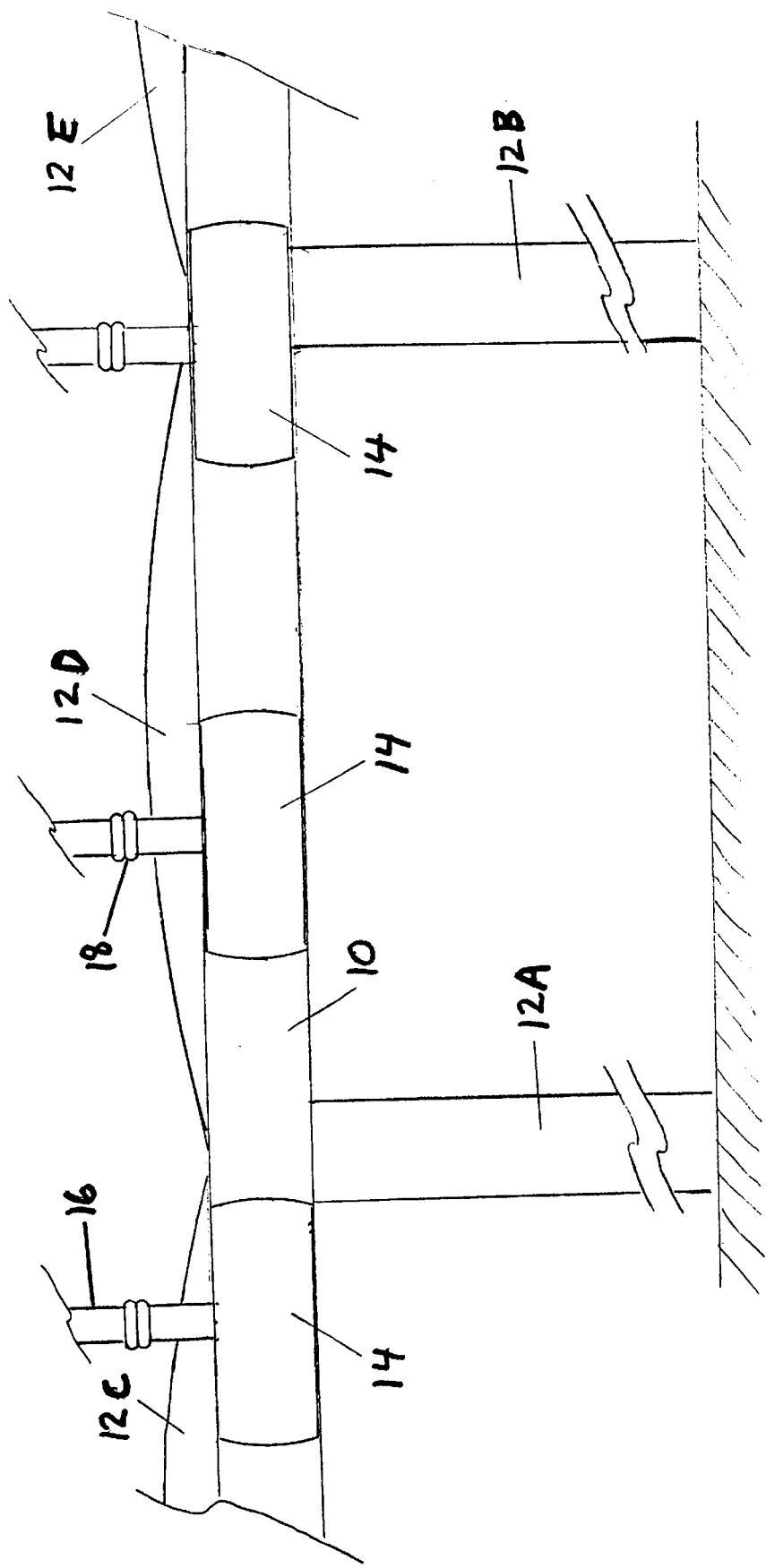

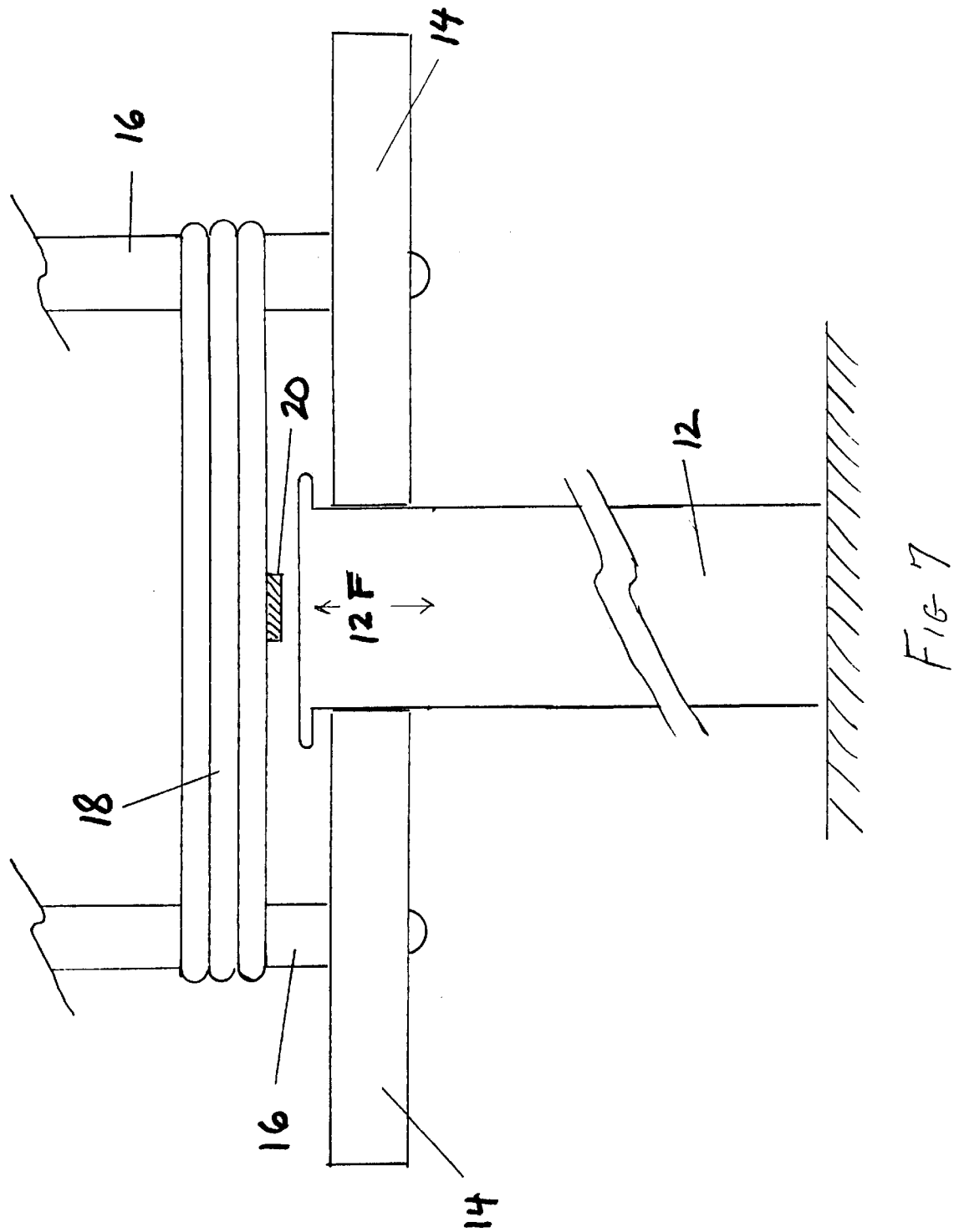

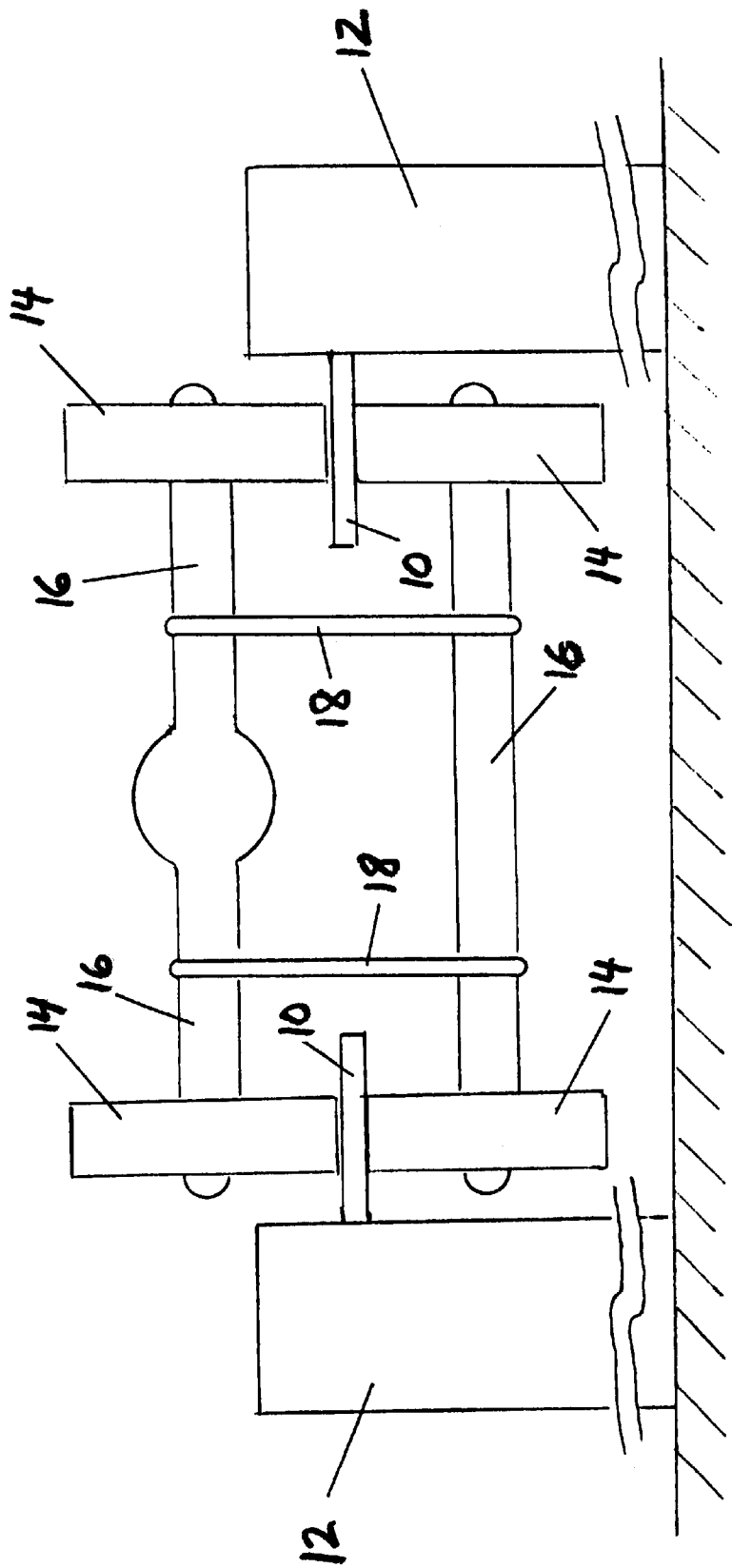

US 6,386,117 B1

ROADWAY/VEHICLE INTERFACE APPARATUS

BACKGROUND OF THE INVENTION

The invention pertains to roadways, particularly elevated roadways, and more particularly concerns the interface of vehicle wheels and an elevated vertical roadway along which a vehicle moves, and the provision of improved vehicle/roadway interaction providing more traction than using vehicle weight would allow, allowing steeper roadway grade, improved roadway lifetime, reduced construction and maintenance expense, higher vehicle acceleration and deceleration, and a smoother vehicle ride.

The most common means for establishing adequate traction of the vehicle drive wheels against a roadway has been the reliance upon the weight of the vehicle, pressing each wheel against the roadway with sufficient force to allow adequate traction. Though this conventional approach has of course been exploited to great advantage, it exhibits problems addressed by the present invention.

Since, in the conventional approach, the maximum traction which can be maintained depends upon the component of the vehicle weight force acting perpendicular to the roadway, if the roadway grade becomes too steep, the vehicle drive wheels will slip.

And even on a level grade, there will be drive wheel slippage in the case of vehicle acceleration or deceleration demanding traction greater than that allowed by the vehicle weight.

More importantly, dependence upon very heavy vehicles to attain adequate traction, results in a high rate of roadway damage and required roadway repair and maintenance expense, and reduced roadway lifetime, as roadways are damaged by the heavy vehicles they carry, in large part because of oscillations of the vehicle's wheels against the roadway. This could be greatly reduced if improved traction could be obtained by means independent of vehicle weight, so that vehicles lighter than conventional ones could successfully be used, and if oscillations of the wheels against the roadway could be nearly eliminated.

So two needs met by the present invention are the need for means to establish improved vehicle-wheel-to-roadway traction independently of vehicle weight and the need for means to greatly reduce the oscillation of vehicle wheels against the roadway.

Another problem of the conventional roadway/vehicle interface is that wheel oscillations cause not only a high rate of roadway damage, but also an irregular, bumpy vehicle ride, displeasing to paying passengers.

So another need not met by the conventional approach but addressed by the present invention, is the provision of means which allow maintenance of a smooth vehicle ride with relatively little wheel oscillations.

These needs are met in the present invention, by the combination of an advantageous roadway and vehicle wheel interface geometry, and a traction affording means which also serves substantially to prevent vehicle wheel oscillations. The interface geometry is formed by a vertical roadway having normally mirror-image vertical sides that each have a slightly concave portion between two flat portions and that receive the convex wheel rims with each wheel being passively steerable and mounted on a vertical axle attached to the vehicle, with the width of the wheel rim being equal to or less than the width of the convex portion of the roadway. The traction affording means is a compression means for causing the wheel rims to be in strong compression against the convex portion of the vertical sides of the roadway. The compression force acting upon each wheel exceeds the weight supported against gravity by that wheel. Thus more traction is available than may be obtained by using vehicle weight.

It is readily seen that the combined effects of the interface geometry and compression means are to not only afford superior traction between the wheel and roadway, but to also cause the wheels to stay substantially centered in the thinnest part of the roadway, with minimum oscillations against it.

Since the amount of traction which may be developed between the wheel rim and the roadway depends not only upon the force urging the wheel against the roadway but also upon the coefficient of friction between them, the present invention in some embodiments, has wheel rims formed of composite materials that offer a high coefficient of friction. In other embodiments the wheel rims are formed of steel because steel wheels on a steel roadway offer the lowest thrust loss to rolling friction.

SUMMARY OF THE INVENTION

The invention is an apparatus for the interface of a vehicle's wheels and an elevated roadway, for achieving more traction than that possible by using the vehicle's weight, and for minimizing vehicle wheel oscillation against the roadway. Said apparatus has a roadway/wheel interface geometry comprising a roadway with normally at least substantially vertical and normally mirror image sides, with said sides each having slightly concave portions, and slightly convex wheel rims of horizontal vehicle wheels rolling along said concave portions of the roadway sides, with said wheels normally being passively steerable and rotating about at least substantially vertical axles secured to the vehicle, said wheel rims having a width equal to or less than the width of the concave portion of the roadway sides; and said apparatus having a compression means, independent of vehicle weight, for causing the wheels to be in substantial compression against the sides of the roadway. In one embodiment said compression means comprises the combination of pairs of parallel wheel axles on opposite sides of the roadway, and cables in substantial tension around each said pair of axles. One embodiment of the invention further comprises use of light weight wheels formed principally of aluminum with rims of composite material such as that used in conventional auto tires, offering a high coefficient of friction. Another embodiment also comprises use of lightweight wheels but with rims of steel which minimize loss of thrust to rolling friction.

BRIEF DESCRIPTION OF THE DRAWINGS

FIG. 1(a) is an end view of the roadway, without the wheels, axles and compression means of this invention, indicating roadway sides having portions with slight concavity.

FIG. 1(b) is a side elevational view of the roadway shown in FIG. 1(a).

FIG. 3(a) is an end view of the roadway, as in FIG. 1(a), for an embodiment in which the roadway sides have zero concavity.

FIG. 3(b) is a side elevational view of the structure shown in FIG. 3(a).

FIG. 5 is an end view for an embodiment having roadway sides with slight concavity, for an embodiment in which the vehicle is located above the roadway.

FIG. 6(a) is an end view as in FIG. 5, but for an embodiment in which the roadway sides have greater concavity and are more widely separated, than in the FIG. 5 embodiment.

FIG. 6(b) is a side elevational view of an embodiment, again with the vehicle moving above the roadway, using archways to supplement the support afforded by relatively widely spaced individual supports.

FIG. 7 is an end view of an embodiment in which the vehicle moves above the roadway, in which the roadway is formed simply from flat sides of a concrete roadway support structure.

FIG. 8 is an end view of another embodiment, having horizontal and flat roadway sides.

DESCRIPTION OF THE PREFERRED EMBODIMENTS

Figure 2A:
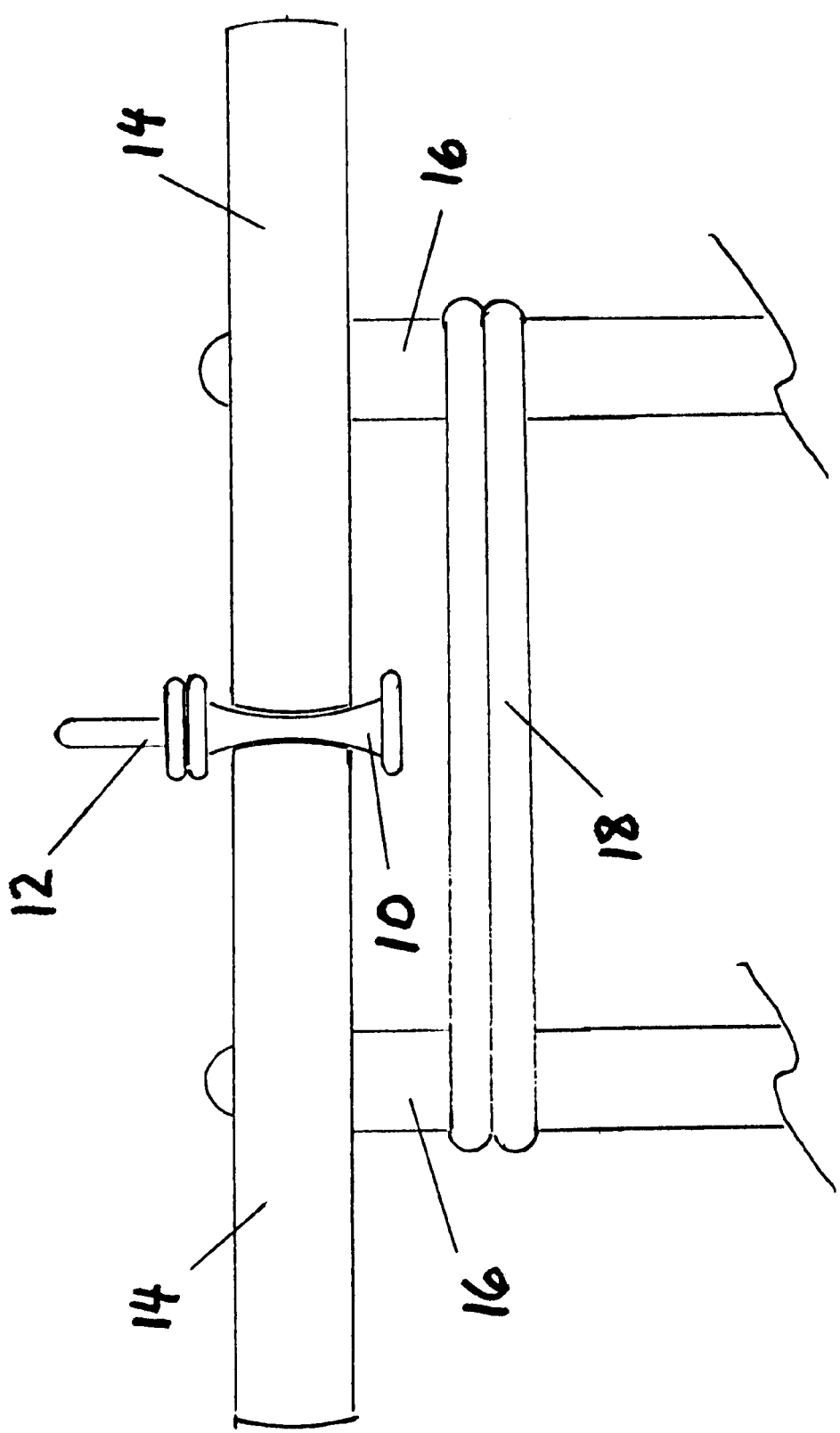
FIG. 2(a) is an end view, as in FIG. 1(a), also showing a support means, with the vehicle wheels, axles, and compression means also in place, for an embodiment in which the roadway sides have appreciably greater concavity than for that shown in FIG. 1(a).

Referring now to the drawings, in which like reference numbers denote like or corresponding elements, FIGS. 1(a) and 1(b) show the roadway 10 of the present invention, having concave vertical sides as shown in portion A of the sides in FIG. 1(a); more pronounced concavity of the roadway sides is indicated in the embodiment shown in FIG. 2(a). The roadway 10 is supported by a plurality of supports 12, from other support structures (not shown) connected to the Earth, which are adequate to support the weight of vehicles and roadway employing the present invention. Neither the supports 12, nor said other support structures, are part of the present invention.

Figure 2B:
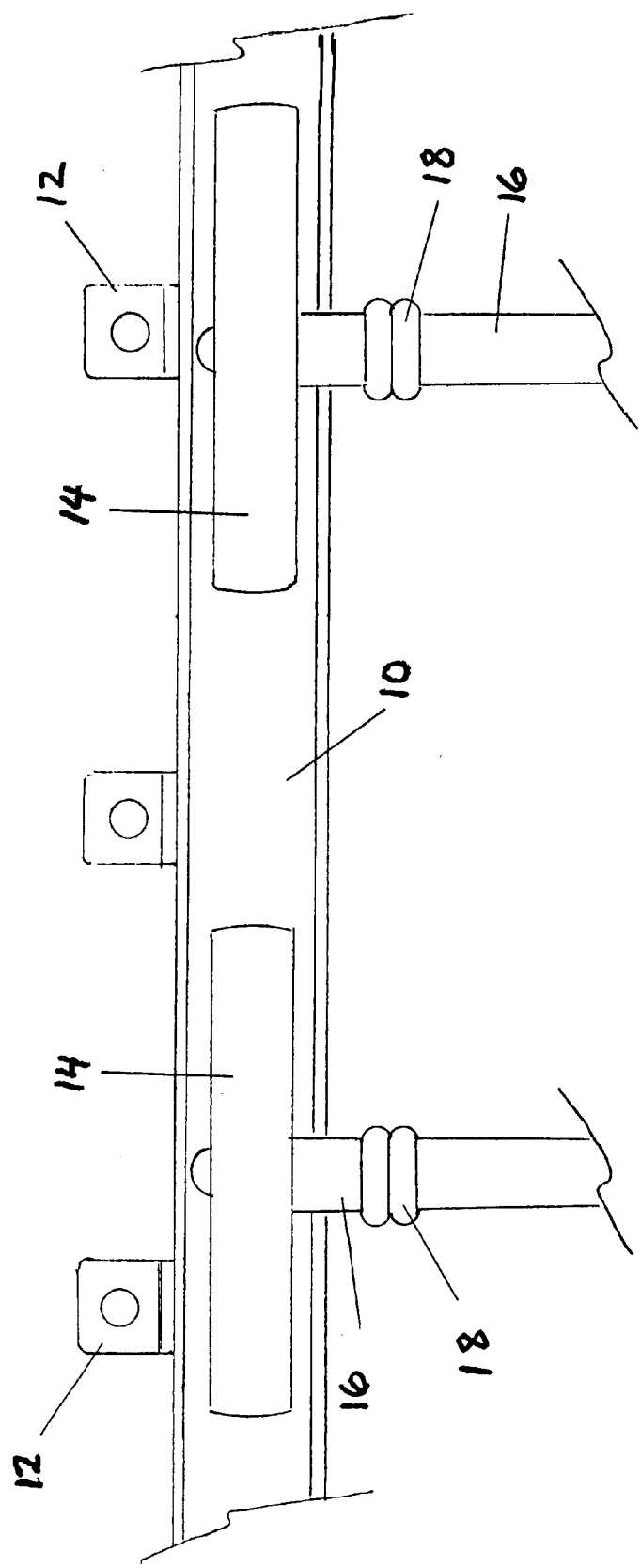
FIG. 2(b) is a side elevational view of the structure shown in FIG. 2(a).

The other parts of the present invention, in addition to roadway 10, shown in FIGS. 2(a) and 2(b), are horizontal vehicle wheels 14, mounted upon axles 16 which are secured to the vehicle, and a compression means 18, which are further discussed below. Other parts of the vehicle, other than the axles 16, vehicle wheels 14, and compression means 18, are not shown because they are not part of the present invention. The vehicle wheels 14 are rotatably mounted upon axles 16 to be passively steerable and also rotate about axles 16 by well known rotation means such as suitable wheel bearings, which rotation means is not shown because it is not part of the invention.

The compression means 18 employs one or more endless cables 18, around both of axles 16 in substantial tension, so as to strongly compress the convex rims of opposite vehicle wheels 14 against the vertical concave sides of roadway 10, as best seen in FIG. 2(a). The axles 16 of an opposing pair of wheels must be attached to the vehicle in a way that produces little or no resistance to the small but necessary movement that the axles must make towards each other to establish the necessary force of the wheel rim against the roadway 10. If this is done and if the axles 16 are stiff enough, the force of each wheel rim against roadway 10 will be about the same as the tension in cables 18.

If two rims of an opposing pair of vehicle wheels 14 were separated by more than the maximum thickness of roadway 10, the compression cables 18 would break. However, when the wheel rims are centered on the concave vertical sides of roadway 10, there is still strong tension in cables 18, but much less than the tension required to break them. So, it is apparent from examination of FIG. 2(a) that the combined effect of the interface geometry of the convex wheel rims and concave roadway sides, in conjunction with the compression of each of vehicle wheels 14 against the sides of roadway 10, is to automatically center each of vehicle wheels 14 vertically with respect to the sides of roadway 10, and to strongly resist any vertical displacement of the vehicle wheels 14 from the center of each side of roadway 10, strongly tending to return each of vehicle wheels 14 to a vertically centered position in relation to the side of roadway 10.

The tension required in the compression means cables 18, in order to achieve a degree of compression adequate for providing a desired level of traction between vehicle wheels 14 and roadway 10, will of course depend upon the coefficient of friction between the rims of vehicle wheels 14 and roadway 10, which will of course depend upon the choice of materials used in fabricating vehicle wheels 14 and roadway 10. For a given choice of materials, e.g. the choice of composite wheel rims and steel roadway, a person of ordinary skill in the art may readily calculate, from well known engineering principles, the tension required in the cables 18, for given specific dimensions of the invention structure.

A very simple manner of producing a desired level of tension in cable 18, is as follows: Assembly is done with no roadway between the pairs of vehicle wheels 14 and with properly sized cables 18 loosely fitting around axles 16. The vehicle is then forced to roll from the thin to the standard thickness end of a special tapered roadway section. The desired level of tension may be produced by using such a special roadway section having an appropriate ratio of the thicknesses of the standard end and the thin end.

After some operating time, it may be necessary to monitor and adjust the tension in cables 18, especially when composite material is used for the wheel rims. As wheel rims wear, tension in cables 18 will be reduced. Readings from strain gauges that are mounted on the cables 18 could be used to indicate when an increase in tension is necessary. One way to increase cable tension is to force the cables together midway between the axles of a wheel pair by tightening the screws of a mechanical clamp. This could be done manually as required; however, designing a motor driven automated system for continual maintenance of suitable tension would be straightforward for one skilled in the art.

Some more specific suitable choices for operating parameters for the present invention, are given by the following information:

The thinnest part of the roadway 10 should only be thick enough, with an adequate safety factor, to support the heaviest vehicle for the application. A minimum thickness of the order of one inch, for a steel roadway, would be practical in many applications. The maximum thickness, width and radius of curvature for the concave part of the sides of roadway 10, are determined by properties of the cable 18 of the compression means and by the width of the vehicle wheel rims.

A good choice of material for cable 18 would be improved plow steel, which is often used in the main cable for suspension bridges. In bridge applications the working tension is limited to one quarter of the breaking tension. The breaking tension for a one inch diameter cable of improved plow steel is about 40 tons, and breaking tension is nearly proportional to the cross sectional area of the steel used in the cable. So, a two inch diameter cable of improved plow steel that is wound in a similar way would have a breaking tension of about 160 tons. If cable of improved plow steel is used in the compression means with the same 4:1 safety factor, and assuming the axles 16 do not bend significantly, there would be no reason, based on safety considerations, to have roadway thickness increase over its minimum value by more than the length that the cable stretches as tension is increased from the working value to the breaking one. So if it is known how much the cable stretches to break, that, along with the maximum-wheel rim width to be employed on roadway 10, will define a maximum radius of curvature for the concave part of the roadway's vertical sides. Smaller radii of curvature may of course be used, but that would require more material and thus greater cost for the roadway. To estimate how much a steel cable stretches before breaking it is necessary to know the breaking force, the actual cross section of steel involved, and Young's modulus for the steel. The breaking force per unit area of steel divided by Young's modulus yields a ratio of the change in length over the unstressed length. For example, the one inch diameter cable of improved plow steel, mentioned above, has a breaking force or tension of 40 tons or 80,000 pounds. The actual cross section of the steel involved in this cable is about 56% of the area of a one inch diameter circle or about 0.44 square inches. Thus the force that breaks this cable, per unit cross sectional area of steel, is 80,000 lb./0.44 in$^2$, or about 180,000 lb/in$^2$. Assuming that Young's modulus for improved plow steel is $30 \times 10^6$ lb/in$^2$, the change in length over the unstressed length is 0.006 or 0.6%.

If the cables 18 have physical properties like the above example and if they are sized to break at four times their operating tension, then they stretch about 0.6% to break and about 0.15% to achieve working tension. So the difference in length as the cable stretches from working to breaking tension is 0.45% of the original relaxed length. So, for this example, the roadway 10 need only be that much thicker at its thickest part than at its thinnest.

Since the change in cable length from working to breaking tension is so small in this example, only 0.45%, it will not be possible to ignore cable length changes due to large changes in ambient temperature. For example, a change in ambient temperature of 100 deg. F. will change the length of a steel cable by 0.06%. As mentioned above, strain gauges mounted on cables 18 may be used to determine needed adjustment of cable tension. Such a tension adjustment would account for thermal effects as well as wheel rim wear, and could of course be automated, in a manner well known in the art, as already indicated above.

Continuing with this example, if the relaxed length of the cable is 50 inches, the roadway thickness need increase only about 0.2 inch from the thinnest to thickest part.

The width of the concave part of the vertical sides of roadway 10 should be about the same as the widest wheel rim that will be used on the roadway. If the widest rim width is eight inches and if the cables 18 have the physical properties of the above example, then the curvature of the concave part of the roadway will be such that the roadway thickness increases by 0.2 inch at four inches above and below the thinnest part. For this example, the required radius of curvature is 80 inches. The convex curvature of the wheel rim should have about the same 80 inch radius so that it fits the concave sides of roadway 10. However, with this large radius of curvature both the roadway sides and wheel rims are nearly flat.

If the roadway 10 were made exclusively for narrow, solid-steel wheels it would of course be more narrow; and the concave part would have a much smaller radius of curvature than in the first example above. Again for cables 18 like those in the examples above and if the maximum wheel rim width were 3 inches, the concave part would be about 3 inches wide and the radius of curvature would be about 11 inches. The thickest part of roadway 10 would again be only 0.2 inches thicker than the thinnest part. Less steel is required than in the rails of a conventional railroad.

Because of their relatively low coefficient of friction when used on a steel roadway, steel wheel rims would require substantially more compression than composite ones to achieve the same friction force. However, it is not impractical to use as much cable cross section as required to do so.

SOME POSSIBLE VARIATIONS OF EMBODIMENTS

Those familiar with the art will appreciate that the invention may be employed in a wide variety of configurations without departing from the essential substance thereof.

For example, and not by way of limitation, the compression means, for causing the vehicle wheels 14 to be compressed against the sides of roadway 10, need not necessarily be provided by the tensioned cable 18. A motor-driven jack screw, a hydraulic compression means, or attracting magnets might of course be used instead.

And, although the invention would perhaps most commonly be employed in systems having steel roadways 10 and lightweight wheels 14 with composite rims, other materials might advantageously be used instead. For example, bimetallic wheels with aluminum hubs and shrink-fit steel rims might be used instead. It is expected that composite rims would more often be used with passenger vehicles; whereas steel rims would generally be used for freight carrying vehicles, which may be much longer with many more wheels and heavier loads per wheel.

Similarly, since the traction available for a given amount of compression provided by the cables 18 of the invention, will depend also upon the coefficient of friction between the material of the rims of vehicle wheels 14 and the roadway 10, one may advantageously employ wheels having rims formed of composite material, chosen to offer a higher coefficient of friction with roadways of a given composition, e.g. steel roadways.

Although the roadway 10 will often be used in lieu of a conventional monorail or other elevated railway because of its advantages over them, its application is of course not necessarily so limited. It could be used in mining or construction operations for lifting heavy loads vertically. A vertical I-beam roadway would be relatively inexpensive to erect and dismantle.

However, its most important long term application could be as part of a new transportation system to reduce time required for trips between cities that are just far enough apart to make impractical the use of either personal autos or airlines. The elevated roadway 10 would carry a powered vehicle equipped to allow quick loading of rental or personal autos so that a train of autos with their passengers and baggage on board is taken up and transported at about 200 mph between cities. Only one fee would be charged and no terminal building would be required. A passenger would never leave his auto. It is noteworthy that the weight per passenger of a compact auto carrying only the driver (¾ of seats empty) is about the same as the weight per passenger of a modern, conventional railroad passenger car with only ⅓ of its seats empty. Such a system could thus save energy as well as time.

Although the invention will often be used in configurations in which the vehicle moves below roadway 10, as in FIGS. 2(*a*) and 4, use of the invention is not so limited. The invention may be employed in configurations in which the vehicle moves above roadway 10, as in FIGS. 5–8.

When the vehicle is above the roadway measures must be taken to insure stability. In FIG. 5 stability is achieved by using wide, strong wheel rims along with a relatively wide and thick roadway 10 that will not bend under operating stress. The roadway 10 is mounted on a reinforced concrete structure 12.

In FIGS. 6(*a*) and 6(*b*) a two-piece roadway 10 with concave sides is mounted along the sides of a reinforced concrete structure 12. Greater stability is achieved with this two-piece roadway 10 than with the one-piece roadway of FIG. 5, because of the greater separation of the wheels 14 of the wheel pairs. The side view shown in FIG. 6(*b*) illustrates an important advantage of roadway/wheel interface. Between vertical columns 12A and 12B that support and elevate roadway 10, arches 12C, 12D and 12E may be used to provide the necessary strength for long spans without causing bumps in the roadway.

An embodiment similar to that of FIGS. 6(*a*) and 6(*b*) is shown in FIG. 7 in which the roadway 12F is formed simply by the flat vertical sides of the reinforced concrete support structure 12. As with the embodiment of FIG. 4(*a*), an automated steering system with position sensors 20 would be required.

Similarly, though the two sides of roadway 10 may often be closely adjacent, as indicated in FIGS. 1(*a*), 2(*a*), 3(*a*), 4 and 5, the invention might also be employed in configurations in which the roadway sides are more widely separated, as in FIGS. 6(*a*) and 7.

And, widely varying degrees of concavity of the sides of roadway 10 may be found suitable in different applications of the invention, e.g. slight concavity as indicated in FIG. 1(*a*), more pronounced concavity as shown in FIG. 1(*b*), or even zero concavity as indicated in FIGS. 3(*a*), 7 and 8. When the sides have zero concavity (when they are vertical and flat) some of the wheels must be actively steered just as on a conventional horizontal road. For high speed vehicles an automated steering system that uses information from position sensors would be required. The position sensors 20 on the vehicle measure and provide to the steering system the distance between position sensors 20 and the roadway. The measurement could be made in a number of ways. For example, a position sensor 20 could consist of an electrically conducting plate mounted on the cables 18 with the plate being parallel to the bottom surface of the roadway. The electrical capacitance between the plate and roadway would be a function of the distance between them. Continual measurement of this capacitance would yield continual knowledge of the position of the vehicle wheels 14 on roadway 10.

Figure 4A:
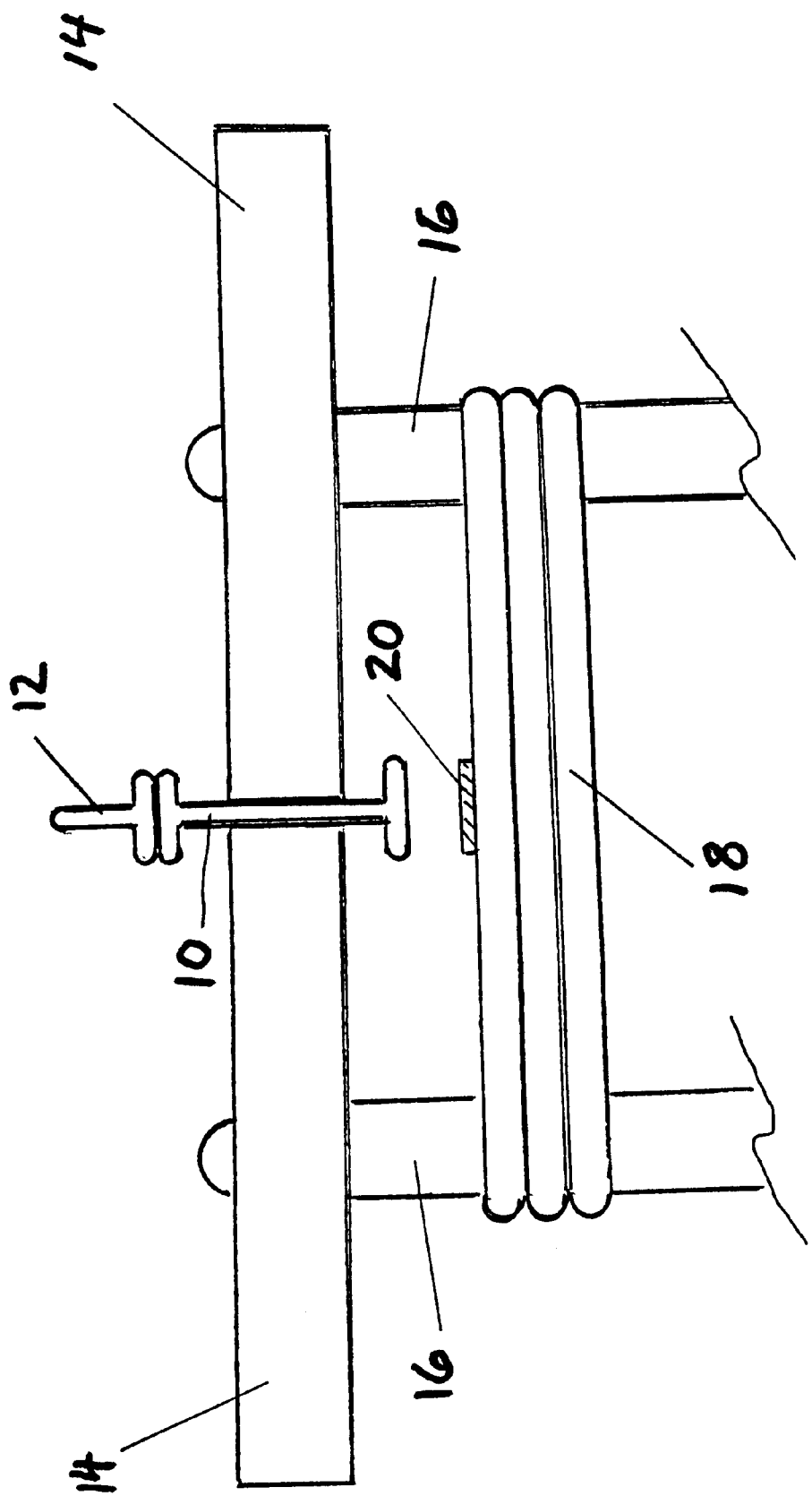
FIG. 4(a) is an end view, also showing a support means, with the vehicle wheels, axles, and compression means also in place, for an embodiment having flat roadway sides as in FIG. 3(a).
Figure 4B:
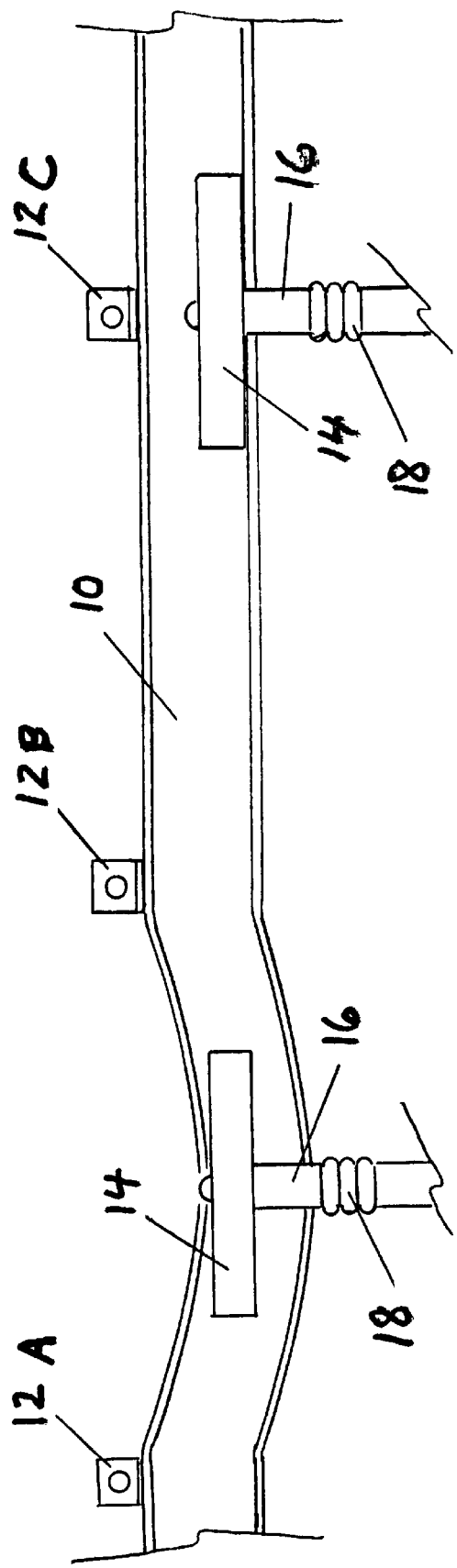
FIG. 4(b) a side elevational view, for an embodiment with flat roadway sides as in FIG. 4(a), with multiple roadway supports, showing roadway sag which can occur between supports, due to vehicle weight, to illustrate the importance of active vehicle wheel steering in flat roadway embodiments.

Flat vertical roadways and vehicles with active steering could deliver a smooth ride on elevated roadways that have either a sag or an arch between support points. This potential is illustrated in FIG. 4(*b*), showing a side view snapshot of the roadway/wheel interface as the vehicle moves to the right. Of the two wheel pairs shown, the first is directly beneath support 12C, while the second is midway between supports 12A and 12B. The portion of the vehicle weight supported by this second wheel pair causes a sag of the roadway between supports 12A and 12B. However, as the sag was occurring, the active steering system was compensating by moving this wheel pair to the top of roadway 10, as shown. At this same instant, the first wheel pair is at the bottom of roadway 10, the steering system having just compensated for the up-hill part of the sag, between supports 12B and 12C. Thus the full width of roadway 10 may be used to produce a smooth ride.

This capability could justify a more complicated vehicle by allowing long spans between support points at relatively low cost.

In all the above-described embodiments the roadway 10 has vertical sides against which the wheel rims are compressed by means independent of vehicle weight, so that the invention need not be used with wheels rolling along a horizontal roadway with adequate traction being provided by reliance on vehicle weight. But it is of course possible to use the compression means in a configuration involving horizontal roadway sides, which would in this case be on the top and bottom of roadway 10, as illustrated in FIG. 8, so that adequate traction could be provided even for very light vehicles.

The scope of the invention is defined by the following claims, including also all subject matter encompassed by the doctrine of equivalents as applicable to the claims.

I claim:

1. Apparatus for the interface of a vehicle wheel and roadway, said roadway being supported in a substantially fixed position with respect to the Earth by a support means, said apparatus being apparatus for achieving superior traction between said wheel and said roadway independently of the weight of said vehicle, and for minimizing oscillation of said wheel upon said roadway, said apparatus comprising:

said roadway having at least substantially vertical and concave sides;

a plurality of at least substantially horizontal wheels rotating about at least substantially vertical axles secured to said vehicle, said wheels having convex rims rolling along said concave sides of said roadway; and a compression means, connected to said wheels, for causing said wheels to be compressed against said sides of said roadway with compression adequate to allow a desired amount of traction to be maintained between said wheels and said roadway, independently of said weight of said vehicle.

2. Apparatus of claim 1, wherein said compression means comprises:

said wheels and said axles being configured in pairs on opposite sides of said roadway; and an urging means, connected to each said axle of each of said pairs of axles, for urging said axles to move toward one another and toward said roadway, so as to compress said wheels of said pair of wheels against said opposite sides of said roadway.

3. Apparatus of claim 2, wherein said urging means comprises, for each of said pairs of axles, at least one cable wound in substantial tension around each of said axles, said tension being sufficient to allow said urging means to compress said wheels against said opposite sides of said roadway, with compression adequate to cause said compression means to allow adequate traction to be maintained between said wheels and said roadway, independently of said weight of said vehicle.

4. Apparatus of claim 1, wherein said wheels have rims with width equal to or less than the width of the concave part of said sides of said roadway.

5. Apparatus of claim 1, wherein said wheels are formed principally of aluminum, but have steel rims.

6. Apparatus of claim 1, wherein roadway is steel and said wheels have rims of composite material having a greater coefficient of friction with said steel roadway than that of a steel wheel rim.

7. Apparatus of claim 1, wherein said vertical sides of said roadway are at least substantially mirror images of one another.

8. Apparatus of claim 1, wherein said wheels are passively steerable.

9. Apparatus of claim 1, wherein said vehicle is below said roadway.

10. Apparatus of claim 1, wherein said vehicle is above said roadway.

11. Apparatus of claim 1, wherein said sides of said roadway have a degree of concavity which is at least substantially zero.

12. Apparatus for the interface of a vehicle wheel and roadway, said roadway being supported in a substantially fixed position with respect to the Earth by a support means, said apparatus being apparatus for achieving superior traction between said wheel and said roadway independently of the weight of said vehicle, and for minimizing oscillation of said wheel upon said roadway, said apparatus comprising:

said roadway having at least substantially horizontal sides;

a plurality of at least substantially vertical wheels rotating about at least substantially horizontal axles secured to said vehicle, said wheels having rims rolling along said sides of said roadway; and a compression means, connected to said wheels, for causing said wheels to be compressed against said sides of said roadway with compression adequate to allow a desired amount of traction to be maintained between said wheels and said roadway, independently of said weight of said vehicle.

* * * * *